Aug. 21, 1934.   J. DE LA CIERVA   1,971,033
AIRCRAFT WITH ROTATIVE SUSTAINING BLADES
Filed Sept. 15, 1931    4 Sheets-Sheet 2
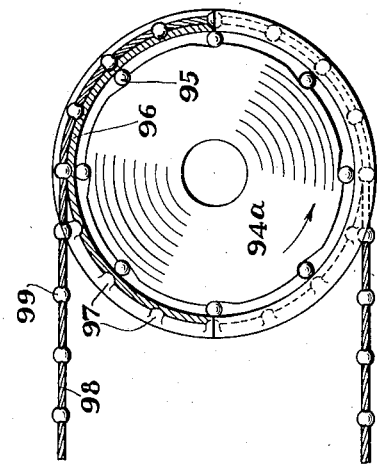
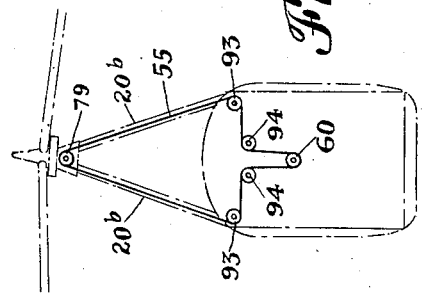
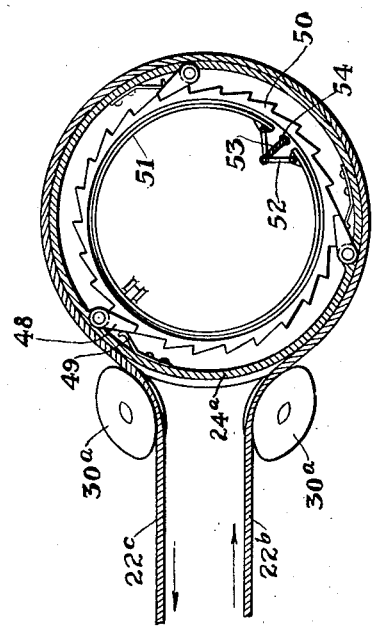
INVENTOR.
Juan de la Cierva.
BY
Lynnestvedt + Lechner
ATTORNEYS.

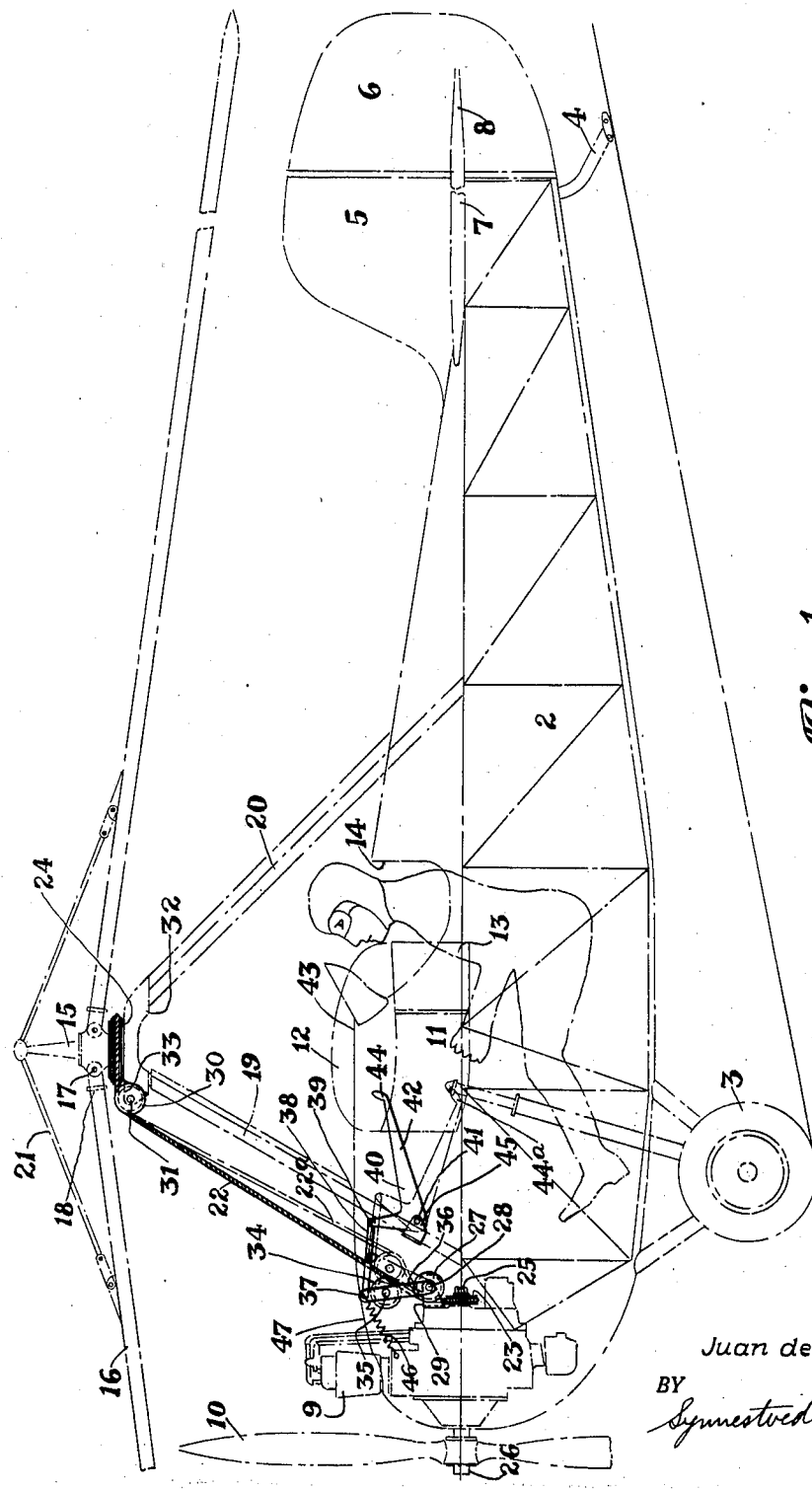

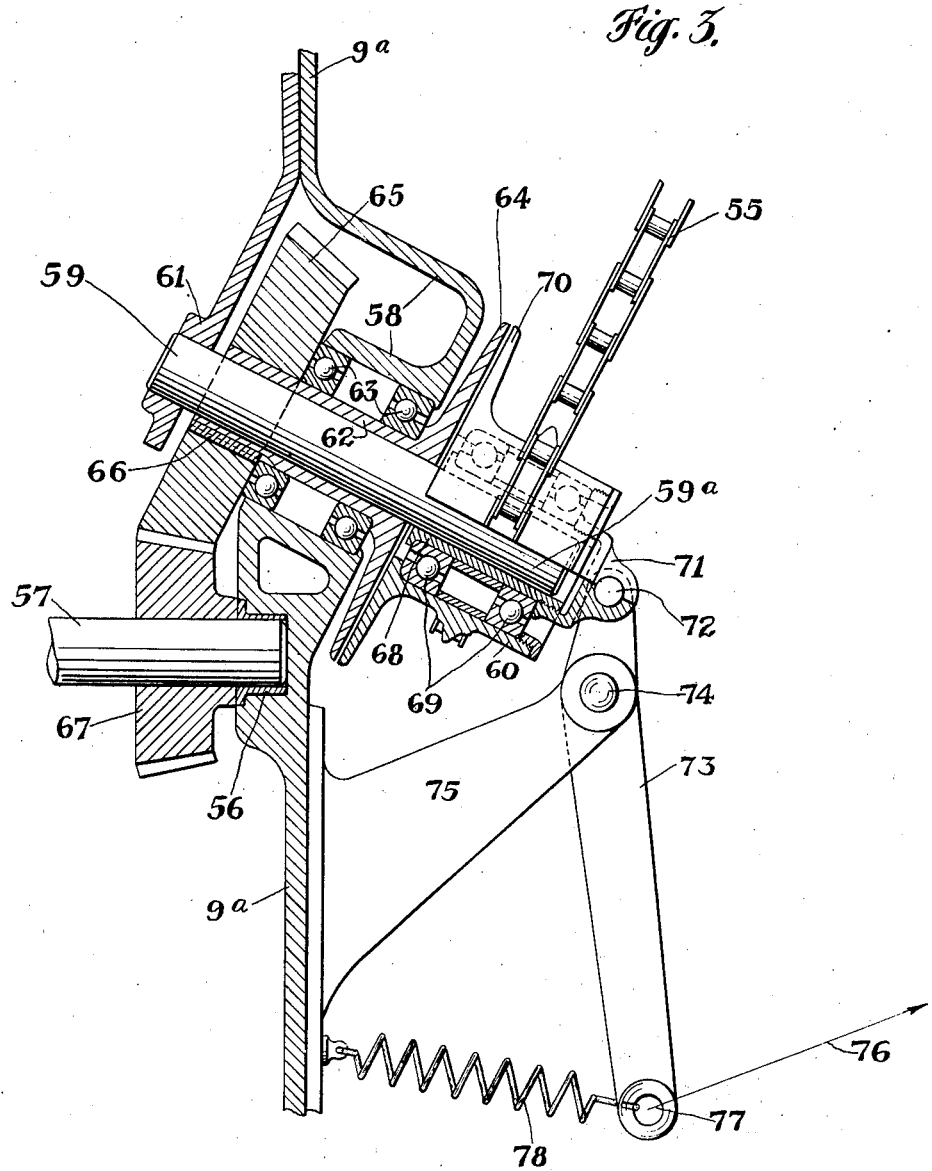

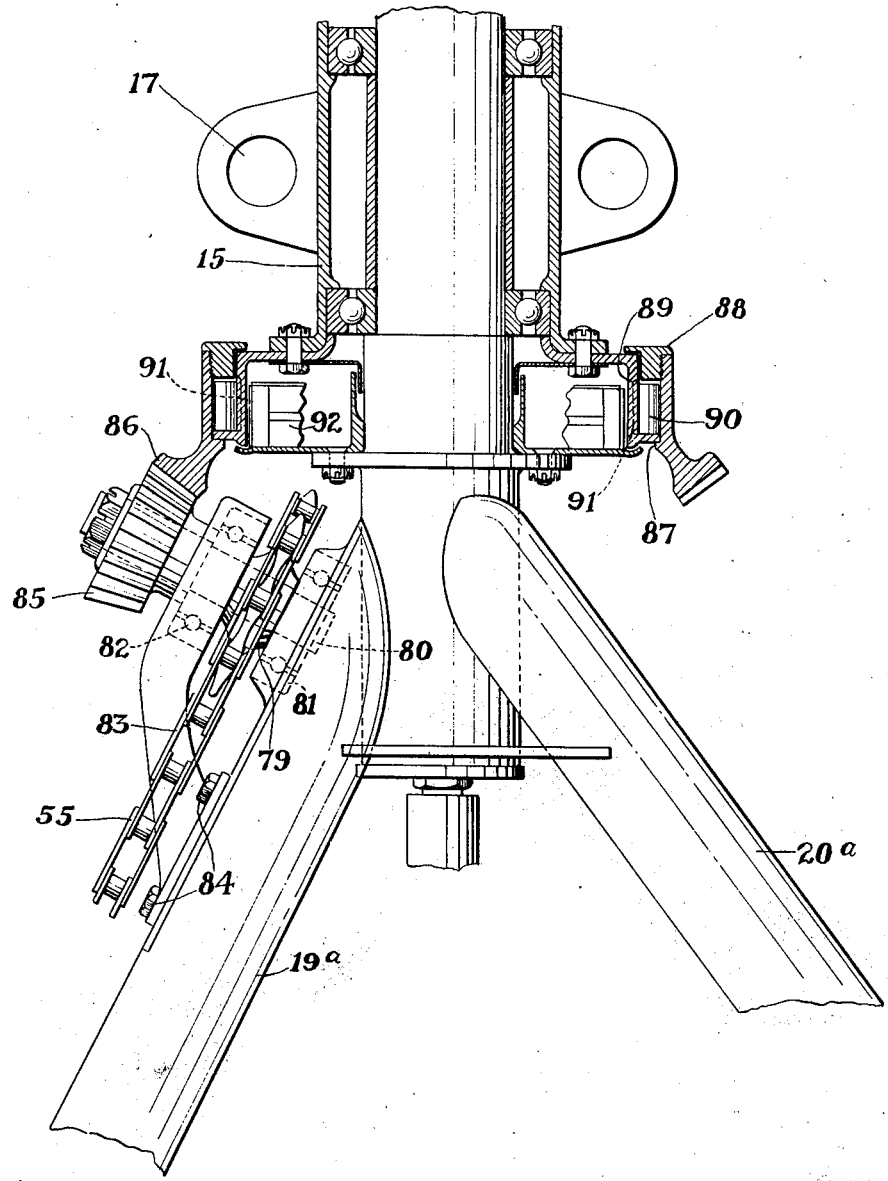

Patented Aug. 21, 1934

1,971,033

UNITED STATES PATENT OFFICE 1,971,033

AIRCRAFT WITH ROTATIVE SUSTAINING BLADES

Juan de la Cierva, Madrid, Spain, assignor to Autogiro Company of America, Philadelphia, Pa., a corporation of Delaware Application September 15, 1931, Serial No. 562,866

9 Claims. (Cl. 244—19)

This invention relates to aircraft with rotative sustaining blades, particularly of the type in which the sustaining blades or wings are, in normal flight, driven by the relative air flow, and individually swung, as on pivots, under the action of variations in flight forces, such as centrifugal, lift, drag, and anti-drag forces, and the invention is especially concerned with the provision of improved means of applying a rotative torque for starting the rotor blades by any suitable source of power, such as the prime mover of the craft.

Primarily, the present invention involves a positive mechanical rotor starter mechanism, with the advantages of uniform effective starting, transmission of adequate power to the rotor, and absolute freedom of blade rotation and pivotation, which advantages are similar to those obtained by mechanical starting means such as disclosed and claimed in the copending application of Joseph S. Pecker, No. 512,383, filed January 30, 1931, while, at the same time, attaining, in combination with the foregoing, certain other novel and useful objects and advantages. For example, by the present invention, I contemplate minimizing the weight of the mechanical starting mechanism for the rotor, which renders it especially useful for very small ships, reducing certain undesirable stresses upon the rotor mounting, pylon and other parts of the aircraft, simplifying the drive mechanism considerably and in general reducing the number of parts necessary for the transmission of starting torque to the rotor and especially minimizing the number of parts to be machined and the cost of construction, assembly, installation, inspection, and maintenance of rotor starting devices.

The invention further involves certain novel cooperative relations between my improved starting mechanism and the rotor, the rotor brake, the mounting pylon structure, the prime mover or engine, and the structural parts of the craft such as the fuselage.

In certain embodiments of my invention I further contemplate the elimination of separate clutching mechanisms, or of reduction gearing, or both; the reduction of the number of operations or movements necessary on the part of the pilot for controlling or operating the starting mechanism; and in fact, if desired, the provision of a positive drive, mechanical rotor starter mechanism, which shall be fully effective under all conditions, controllable by the simple operation of a single control element in one direction, the return of the mechanism to inoperative position being automatic.

More specifically, the invention involves a mechanical starting mechanism which is very flexible in a structural sense as well as in the sense of being adaptable to different arrangements of the main parts of the aircraft, such as the fuselage, engine, cockpits, pylon and rotor; and in which I attain such flexibility of construction, installation and operation by a continuous or closed-circuit flexible mechanical interconnection between a rotor and the source of power, such as the forward propulsion engine of the craft. To this end, I may employ a continuous cable, belt or chain device, operating, in general, around a rotatable pulley or other member actuated by the engine and a rotatable driven pulley or drum or other member mounted on or connected with the rotor axis structure, the change between operative and inoperative condition being effected by means of a tightener, idler, clutch or overrunning device, or by varying the slippage of the continuous flexible member itself in a suitable manner.

How I attain the foregoing objects and advantages, together with such others as are incident to the invention or may occur to those skilled in the art, will be evident from the following description, especially in the light of the accompanying drawings, in which drawings:—

Fig. 1 is a somewhat diagrammatic or outline side view of an aircraft of the type referred to embodying the starter mechanism of the present invention;

Fig. 2 is an enlarged transverse section, with parts in elevation, of a modification of the mechanism adaptable to the upper or driven part of the structure shown in Fig. 1;

Figs. 3 and 3a together form a vertical section, with parts in elevation, showing in enlarged detail, a modified form of the starting mechanism as a whole and its cooperation with a certain type of rotor pylon mount, Fig. 3 showing the lower or driving unit, and Fig. 3a the upper or driven unit;

Fig. 4 is a somewhat diagrammatic front elevational view of a modification of the structure shown in Figs. 3 and 3a adapted for cooperation with a different form of pylon construction; and Fig. 5 is an enlarged detail view, similar to Fig. 2, but illustrating modifications of several of the main features of the mechanism.

By reference first to Fig. 1, it will appear that an aircraft of the freely wind-driven hinged-wing type is disclosed, the craft including, in general, a fuselage structure 2, landing gear 3, 4, vertical and horizontal fixed and controllable surfaces 5, 6, 7 and 8, an engine 9 and propeller 10, small fixed wings 11, carrying upturned tips 12 and ailerons 13, a single cockpit 14, and primary sustaining means comprising a rotor axis structure 15 with air driven blades or wings 16 pivoted to the axis structure by horizontal and vertical pins 17 and 18, and mounted above the body of the craft by means of a pylon, which may be of the three leg type having a forward leg 19 and two rear legs 20 (such pylon being not a part of my invention per se, but being fully disclosed and claimed in the copending application of Juan de la Cierva, Serial No. 497,745, filed November 24, 1930).

The blades 16 are supported, when at rest, as by means of droop cables 21 which become substantially inoperative in flight, as centrifugal force set up by the rotation created under the action of relative airflow holds the blades in a generally outwardly or slightly coned-up position.

As an extremely simple and light-weight mechanism for carrying out the present invention, I have here disclosed a cable, rope or belt 22 which is in the form of a continuous or closed loop, passing at its lower end around the live pulley or wheel 23, and at its upper end around a driven pulley or drum 24. Pulley 23 is mounted in a vertical plane, that is, to revolve on a substantially horizontal axis 25 at the rear face of the engine 9, said axis being, if desired, a rearward extension of the main propeller shaft 26 of the engine. The pulley or drum 24, on the other hand, may be mounted fast on the lower portion of the rotatable axis structure 15 of the rotor, thus being in a position to be rotated in a generally horizontal plane. In accordance with the issued patent of Juan de la Cierva, No. 1,590,497, issued June 29, 1926, the rotor axis 15 may be inclined somewhat; and in accordance with the disclosure of the copending application of Juan de la Cierva, Serial No. 432,773, filed March 3, 1930, the line or axis of the engine or propeller shaft 26 may also be somewhat angled.

The present invention takes care of any desired degree of angularity between such axes and thus between the said pulleys 23 and 24, and to this end I provide: a pair of guide pulleys 27, freely rotatable in parallel vertical planes about a common horizontal axis 28, which latter may be very simply mounted upon the back of the engine by means of brackets 29; and a second pair of pulleys 30, mounted adjacent the drum or pulley 24 for free rotation on a horizontal axis 31, which latter axis or pivot may be conveniently mounted on the apex structure 32 of the pylon, as by means of bracket devices 33. The planes of the pulleys 27 should, of course, be substantially tangent with the right and left sides of the pulley 23; and similarly the planes of the pulleys 30 should be substantially tangent with the right and left sides of the drum or pulley 24. Similarly the plane of the pulley 23 is substantially tangent to the forward edges of the peripheries of pulleys 27, and the plane of pulley 24 is substantially tangent to the upper edges of the peripheries of pulleys 30. Variations in angularity between the axis of the rotor and the axis of the engine may thus be readily made, or built into the craft, and proper operation and guiding of the drive cable will always be assured.

In accordance with the disclosure of Fig. 1, the cable 22 is mounted with sufficient looseness so as normally to slip with respect to either the pulley 23 or the pulley 24. For operating the drive mechanism, I may provide either a single tightener pulley or other slack adjuster 34, positioned to act on either the up-running or down-running side of the cable 22, or I may provide a pair of such tightening pulleys, one on each side of the line. Such tightener pulley is preferably an idler mounted on axis 35, which is carried intermediate the ends of lever 36, the lower end of said lever being pivoted, if desired, upon the same axis 28 on which the pulleys 27 are carried, and the upper end of said lever having a pivoted connection 37 with the forward end of a pull link 38, the rear end of said link being pivoted at 39 to the upper short arm 40 of a bell crank which is pivoted at 41, the other arm 42 of said bell crank preferably extending rearwardly to a position in the cockpit 14, just beneath the cowling 43 and carrying a convenient handle 44 at its rear end. The pivot pin 41 of the operating bell crank may conveniently be mounted on a lower portion of the front leg 19 of the pylon, as by means of a suitable bracket device 45.

In operation, to start the rotor for take-off, the pilot, with the engine 9 running, need only reach up and depress the handle 44 to the position indicated at 44a, whereupon the drive cable is given suitable tautness to set the rotor into operation. The tautened position of the cable is indicated at 22a. When the rotor is up to flight speed the pilot need only remove his hand from the handle 44, and take off in the usual fashion. If desired, or necessary, a small tension spring 46 may be connected between the pivot axis 37 and a fixed part such as the engine, to ensure full return of the starter mechanism to inoperative position.

In the form of mechanism just described, it will be seen that the parts have been reduced to a minimum, and that fine machining and accuracy of workmanship, such as is needed in geared, mechanical drive starters, are unnecessary, and furthermore that the parts may all easily be located inside the cowling 43 and engine housing or fuselage covering 47, with the exception of the exposed length of cable 22 and the upper pulley mechanism 24, 30. Furthermore, the cable runs proximate to the front pylon leg, and if desired may be stream-lined therewith. Likewise, the pulley mechanism at the driven end of the unit may be stream-lined with the pylon apex structure 32. The weight on, and air resistance of, the pylon and its apex are reduced to a minimum. As will be apparent from the illustration, good clearance for all necessary blade pivotation movements on either of the blade articulations (17, 18) is provided, and the absolute freedom of blade rotation and articulation requisite to this type of aircraft is fully maintained.

In Fig. 2 I have illustrated a simple modification or a supplementation of the structure of Fig. 1. Here the up-running cable part 22b and the down-running cable part 22c are brought more closely together, and may, in fact, be brought down closely adjacent the front face of the pylon leg 19 by running them over guide pulleys 30a which are inclined toward each other. The bight of the line or cable runs around a pulley-like drum 24a, which carries, internally, a series of driving dogs 48 urged by springs 49 into driving engagement with the external teeth of ratchet brake drum 50. This drum is suitably extended, vertically, to merge with or be secured to the rotor axis 15. By this general arrangement, overrunning of the rotor under the action of relative air-flow is assured, without depending upon slippage of the cable. Inside the ratchet or drum I may mount any suitable form of brake mechanism, such as a brake band 51, expandible by a toggle mechanism 52, operable by a cord or cable 53 passing downwardly through an aperture 54, whence it may be carried down the left rear pylon leg 20 and into the cockpit for operation.

In Fig. 3 I have fragmentarily shown an endless flexible roller chain 55, the operation of which is just as simple as the operation of the structure shown in Fig. 1, but the mounting and driving connections of which involve modifications now to be described. In the rear wall of the engine 9a is formed, in addition to the bearing 56 for the auxiliary shafting 57, a bearing supporting and housing structure 58, set at such an angle as to support the stationary shaft 59 which marks the axis of the sprocket wheel 60, that such axis is substantially perpendicular to the longitudinal axis of the front pylon leg 19a (Fig. 3a). The angularly disposed stationary shaft 59 is positioned and fixed at its upper end by means of the internal bracket member 61, and is further held in alignment by the sleeve 62 which is mounted for free rotation, around the shaft 59, in bearings 63. Sleeve 62 at its lower end carries or is flared to form a driving disk 64, and toward its inner or upper end is secured to the driven bevel gear 65 as by means of a key 66.

In normal operation of the aircraft, the sleeve 62 with clutch plate or driving disk 64 and gear 65 are idly driven by the driving pinion 67 mounted on the engine auxiliary shafting 57. Around the lower protruding end 59a of the shaft 59 is mounted a slidable sleeve 68, said sleeve carrying the sprocket wheel 60 by means of bearings 69; the flanges and spacer members on sleeve 68 and sprocket 60 acting in cooperation with the bearing races and bearings to prevent relative end movement between said sleeve 68 and sprocket 60, but permitting free rotational movement of the sprocket 60 on the bearings. The sprocket 60 carries or is flared to form a second clutch plate or driven disk 70.

Engagement of the driving and driven disks, which may be spaced with relatively close clearance so as to minimize angular operation of the chain 55, may be effected by a connection member 71 which is secured at the lower end of sleeve 68, the said connection member 71 being pivoted at 72 to the upper end of a lever 73, fulcrumed at 74 on a bracket arm 75, and operable by any suitable control member indicated at 76 which is connected to the lever 73 at the point 77. Such control member may extend back to the cockpit, to be actuated by the pilot, as by pulling on the same. Return of the mechanism to inoperative position is effected by the tendency of the sprocket 60 to slide downwardly, as well as by the tendency of the spring 78 to positively disengage the mechanism. The bracket 75 and spring 78 are conveniently mounted upon the back 9a of the engine. The mechanism just described may be referred to briefly as the lower, the driving, or the engine unit, and the mechanism now to be described may be referred to as the upper, the driven, or the rotor unit.

The upper unit (shown in Fig. 3a) includes a second sprocket 79, about which the upper end of the roller chain 55 runs. This sprocket is fixed on a short shaft 80, mounted in two bearings 81 and 82, the first of said bearings being preferably secured directly to the pylon leg 19a, and the second of the two bearings being secured in a suitable bracket 83 extended downwardly between the up-run and down-run lengths of the chain and secured to the leg 19a as by bolts 84.

At its outer end, the shaft 80 carries a pinion gear 85, in constant mesh with the ring gear 86, said gear preferably having fixed and removable flanges 87 and 88 for positioning it vertically of the rotor axis drum 89. The drive between the ring gear and the drum is preferably by means of an overrunning clutch, such as a series of roller bearings 90 which operate against inclined faces or pockets indicated at 91.

Fixed brake mechanism somewhat diagrammatically indicated at 92 may be housed within the drum 89, and operated by a suitable cable (not shown) similar to the cable 53 of the structure shown in Fig. 2.

It will now be seen that by a simple pull upon the control member 76 the clutch disks 64 and 70 may be brought into contact, thus driving the rotor from the engine through the intermediation of the roller chain and sprockets and the reduction gearing shown. In this construction, as in those previously described, the size, weight and complication of the parts are much reduced as compared with the driving shafting and clutch mechanisms heretofore employed. Furthermore, in this form, as well or more than in the other forms illustrated, the clearance between the driven unit of the mechanism and the rotor blades, even when the latter are drooping (as when at rest) is exceptionally good, the gearing 85 and 86 being located well below the path of rotation of the blades, since it is positioned beneath the combined driving and brake drum.

If it is desired to employ a tripod pylon arrangement in which a single leg extends rearwardly and a pair of legs forwardly (which is one of the arrangements disclosed in the aforementioned application Serial No. 497,745) the chain or belt arrangement may still be held in close proximity to the pylon legs, for purposes of aerodynamical efficiency, by a construction such as shown in Fig. 4. In such construction, in addition to the sprockets 60 and 79, I provide guide sprockets or pulleys 93, 93 adjacent the base of the two forward pylon legs 20b, and a second pair of guide sprockets or pulleys 94, 94, if necessary, to complete the positioning and guidance of the chain 55; it being understood that where a chain drive of the roller chain type is used it is desirable to keep all of the sprockets in as nearly the same plane as possible.

In the modification of Fig. 5, which is a detailed showing of an over-running clutch with modified form of endless drive, corresponding in view with Fig. 2, I disclose a disk or plate 94a, which may be suitably secured to the bottom of the rotor axis structure, driven by the clutch rollers 95 by means of a driving ring 96, notched or recessed at points around its periphery as indicated at 97. The cable 98 passes around the driving ring 96 and is provided with fixed beads or collars 99 adapted to transmit the driving torque to the ring by engagement with the recesses 97. For such a cable a link chain might be substituted, either of such driving devices making it unnecessary to keep the guide pulleys in one plane. Moreover, the beaded cable as well as a link chain, if such should be employed, has an advantage in common with the roller chain, in that the necessary starting torque is transmitted by positive engagement of elements of the chain itself, so that it need not be put under such a tension as is required with a plain cable or belt, which latter must be tight enough to drive by frictional contact. Thus the weight of the mechanism and the size and strength of the cable or chain may be reduced as compared with the construction employed in the showing of Figs. 1 and 2.

From the foregoing description, it will be clearly apparent that all forms embodying the present invention involve the characteristic of substantial flexibility, both as to actual physical construction, adaptation to various rotor, pylon, engine, and fuselage, arrangements, and as to length or distance or direction through which the power must be transmitted. For example, for different locations of the rotor, as to height above the fuselage, or to distance behind the engine, substantially the only change necessary is a change in the length of the closed driving cable or loop. For difference in angularity, all forms of the invention provide a certain degree of flexibility, but this is especially true of the forms shown in Figs. 1 and 2 and 5. For differences in disposition of the pylon legs any form of the invention may be readily adapted. Any form of the mechanism shown will co-operate well with either a manual clutch or a free-wheeling device or both. The cable, rope or belt forms, however, lend themselves additionally to the use of idlers or other means to give and take-up slack.

Low costs, both initial and maintenance; ease of inspection and repair; simplicity and light weight; ready operation; and flexibility of adaptation as well as of operation; are characteristic of the invention.

I claim:—

1. In an aircraft, a fuselage, a propulsion engine mounted therein, a pylon mounted thereon, a sustaining rotor mounted on the pylon for normal actuation by relative air flow in flight, and a rotor drive system including a closed-circuit flexible driving power connection extending up said pylon from engine to rotor, said pylon being formed with mounting leg means, and means for retaining said flexible driving power connection in general proximity to said leg means.

2. In an aircraft, a fuselage, a propulsion engine mounted therein, a pylon mounted thereon, a sustaining rotor mounted on the pylon for normal actuation by relative air flow in flight, and a rotor drive system including a closed-circuit flexible driving power connection extending up said pylon from engine to rotor, said pylon being formed with mounting leg means, and rotatable elements for the drive system having bearings mounted on said leg means.

3. In an aircraft of the character described, a forward propulsion engine, a sustaining rotor having a hub structure with swingingly-arranged sustaining blades, a drum adjacent said hub structure, driving connections between the engine and the drum including an endless belt device, and an over-running connection between said drum and said hub structure, with brake means housed within said hub structure.

4. In an aircraft of the character described, a forward propulsion engine, a sustaining rotor having a hub structure with swingingly-arranged sustaining blades, starting means for the rotor, connected to drive said hub structure and having an endless flexible drive element lying in the major part of its traverse in a plane oblique to the rotor axis and to the engine axis, a driving wheel for the said endless element rotating on an axis substantially normal to said plane, and bevel gearing connecting said wheel into the engine and so proportioned as to compensate for angularity.

5. In an aircraft of the character described, a forward propulsion engine, a sustaining rotor having a hub structure with swingingly-arranged sustaining blades, starting means for the rotor connected to drive said hub structure and having an endless flexible drive element lying in the major part of its traverse in a plane oblique to the rotor axis and to the engine axis, a driving wheel for the said endless element rotating on an axis substantially normal to said plane, and bevel gearing connecting said wheel into the engine and so proportioned as to compensate for angularity, together with clutch means shiftable with said wheel axially thereof.

6. In an aircraft of the character described, a forward propulsion engine, a sustaining rotor having a hub structure with swingingly-arranged sustaining blades, starting means for the rotor connected to drive said hub structure and having an endless flexible drive element lying in the major part of its traverse in a plane oblique to the rotor axis and to the engine axis, and means for drivingly connecting said element to said engine and to said rotor and arranged to accommodate such angularity.

7. For an aircraft of the character described, a normally air driven rotor, an axis structure for the rotor mounted and terminating above the craft, a main propulsion engine, a propeller mounted at the front thereof, and a rotor starter system which includes an endless flexible driving cable or the like, a driving wheel or pulley connected with the back end of said engine and engaging said cable, an over running clutch on said rotor, a driven wheel or pulley directly connected with the rotor through said over-running clutch and engaging said cable, and an idler for effecting tightening of said cable, said idler having a mounting upon the back of the engine, and means for convenient operation, of said idler from an operator's position.

8. In an aircraft, the combination of a forward propulsion engine with its propeller, an air actuated sustaining rotor, and means for starting said rotor from said engine including an endless flexible drive element extending generally between the engine and the rotor, and an axially slidable drum or sprocket about which said element passes, and means for sliding said drum or sprocket into and out of engagement with a rotating part of the starting system.

9. In an aircraft of the character described, means of forward propulsion including an engine, a sustaining rotor having a hub structure mounted above and terminating short of the body of the craft and having sustaining blades pivotally mounted on said hub structure in position to be rotated by relative air-flow, a rotatively mounted drive element adjacent to said hub structure, a driven rotary part associated with the hub structure and connected to turn therewith, driving connections between the said forward propulsion engine and the said rotatively mounted drive element and including an endless flexible drive device drivingly associated with and turning about said drive element, a rotor brake mechanism operating at one side of said driven rotary part, and an over-running drive connection operatively interposed between the other side of said driven rotary part and the said rotatively mounted drive element and constructed to effect automatic disconnection of the drive system closely adjacent the rotor when the latter turns aerodynamically faster than the said drive element, means for operating said rotor brake against said driven rotary part, and additional means for disconnecting at will the operation of the driving connections when the rotor brake is used to slow down the rotation of the rotor.

JUAN DE LA CIERVA.